(12) United States Patent
Aoki et al.

(10) Patent No.: US 6,778,337 B2
(45) Date of Patent: Aug. 17, 2004

(54) OPTICAL ATTENUATOR AND OPTICAL ATTENUATOR MODULE

(75) Inventors: Takuma Aoki, Tokyo (JP); Kouki Sato, Tokyo (JP); Nobuyuki Shibata, Tokyo (JP); Toshimitsu Nishiwaki, Tokyo (JP); Mizuki Oike, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 31 days.

(21) Appl. No.: 10/001,124

(22) Filed: Nov. 30, 2001

(65) Prior Publication Data

US 2002/0085285 A1 Jul. 4, 2002

(30) Foreign Application Priority Data

Dec. 12, 2000 (JP) ........................................ 2000-377673
Apr. 4, 2001 (JP) ........................................ 2001-106127

(51) Int. Cl.[7] ............................. G02B 9/00; G02B 5/22; G02B 6/00
(52) U.S. Cl. ...................... 359/738; 359/888; 385/140
(58) Field of Search ................................ 359/583, 738, 359/888, 889, 239, 577; 385/140, 36; 372/20, 100

(56) References Cited

U.S. PATENT DOCUMENTS

| | | | |
|---|---|---|---|
| 3,746,429 A | 7/1973 | Spindel et al. ............... | 359/888 |
| 4,904,044 A | 2/1990 | Tamulevich ................. | 385/56 |
| 4,932,625 A | 6/1990 | Hotchkiss, Jr. .......... | 248/316.7 |
| 4,989,938 A | 2/1991 | Tamulevich ................. | 385/33 |
| 5,175,913 A | 1/1993 | Mackie et al. ................ | 24/562 |
| 6,115,401 A * | 9/2000 | Scobey et al. .............. | 372/100 |
| 6,289,028 B1 * | 9/2001 | Munks et al. ................. | 372/20 |
| 6,292,298 B1 * | 9/2001 | Glance ....................... | 359/583 |
| 6,292,616 B1 * | 9/2001 | Tei et al. .................... | 385/140 |
| 6,292,618 B1 | 9/2001 | Ohara et al. ................. | 386/46 |
| 6,442,324 B2 * | 8/2002 | Tei et al. .................... | 385/140 |
| 2002/0001447 A1 | 1/2002 | Tei et al. .................... | 385/140 |

FOREIGN PATENT DOCUMENTS

| | | |
|---|---|---|
| DE | 1 793 459 | 8/1959 |
| DE | 4428142 A1 * | 2/1996 |
| EP | 0378851 A2 | 7/1990 |
| GB | 2013768 A | 1/1979 |
| JP | 62-11822 | 1/1987 |
| JP | 2000-56242 A | 9/2001 |

OTHER PUBLICATIONS

A European Search Report for European Application No. 01129513 dated Apr. 29, 2002.

* cited by examiner

*Primary Examiner*—David N. Spector
(74) *Attorney, Agent, or Firm*—Oblon, Spivak, McClelland, Maier & Neustadt, P.C.

(57) ABSTRACT

An optical attenuator (8) has a substrate (glass substrate) (1) and an optical attenuation film (2) that attenuates an input light with a predetermined optical attenuation factor, and the optical attenuation film (2) is disposed on a light input face (3) of the substrate (1). An angle defined by the light input face (3) and the light output face (4) of the substrate (1) is set to 0.15° to 0.5°. A protective film (5) for preventing the deterioration of the optical attenuation film (2) is formed on a surface of the optical attenuation film (2).

40 Claims, 9 Drawing Sheets

OPTICAL ATTENUATOR AND OPTICAL ATTENUATOR MODULE

BACKGROUND OF THE INVENTION

1. Field of the Invention

The present invention relates to a variable optical attenuator used for attenuating light in optical communications.

2. Background of the Invention

Up to now, optical attenuators used in an optical communication system or an optical measuring system are mainly structured as the following three types. A first type is structured such that optical fibers are so arranged as to face each other at an interval, and a magneto-optical crystal is disposed between those optical fibers. A second type is structured to utilize a thermo-optical effect. A third type is structured such that optical fibers are disposed to face each other at an interval, and a medium having an optical attenuation function such as an optical attenuation film or an optical attenuation plate is disposed between those optical fibers.

The optical attenuator structured to provide the above optical attenuation film is, for example, shown in FIG. 10. A tabular glass substrate 1 has a light input face 3 and a light output face 4 which are in parallel with each other. The surfaces of the glass substrate 1 (light input face 3 and light output face 4) are formed, for example, with antireflection films 14a and 14b which are about 0.1% in optical reflectivity. The light input face 3 is formed with an optical attenuation film 2.

The optical attenuation film 2 shown in the figure has a film thickness distribution in an x-direction of the figure. The film thickness distribution has an optical attenuation factor distribution (a change in the optical attenuation factor) in the x-direction. The optical attenuation film 2 may be formed with the optical attenuation film 2 on at least one face of the light input face 3 and the light output face 4.

However, in the above-mentioned conventional optical attenuator, the light input face 3 and the light output face 4 of the glass substrate 1 are in parallel with each other. For that reason, the light interferes with each other between the light input face 3 and the light output face 4 in a multiplexing manner. As a result, as shown in FIG. 11, the optical attenuation factor of the optical attenuator has the wavelength dependency.

That is, the optical attenuation factor of the optical attenuator periodically changes depending on the wavelength, and a difference between the maximum value and the minimum value of the optical attenuation factor becomes about 0.3 dB. In the light transmission spectrum shown in the figure, the period of the wavelength dependency of the optical attenuation factor is set to 1.5 nm.

Japanese Patent No. 2933919 discloses a structure in which the light input face 3 and the light output face 4 of the glass substrate 1 are not in parallel but tapered. The structure has a glass substrate 1 and an optical attenuation film 2 as in the device shown in FIG. 10.

SUMMARY OF THE INVENTION

According to the present invention, there is provided an optical attenuator comprising;

a substrate having a light input face and a light output face with an angle defined by the light input face and the light output face of said substrate being set to be within a scope from 0.15° to 0.5°; and an optical attenuation film attenuating an input light with a predetermined optical attenuation factor, formed on at least one face of said light input face and said light output face of said substrate.

According to the present invention, there is provided an optical attenuator module, comprising:

an optical attenuator as set forth in any one of claims 1 to 9;

a first optical fiber that receives a light which is to be inputted to said optical attenuator from an external;

a second optical fiber that inputs the light outputted from said first optical fiber and passing through said attenuator, and outputs the light to the external; and an optical attenuator moving means that moves said optical attenuator.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Hereinafter, a description will be given in more detail of preferred embodiments of the present invention with reference to the accompanying drawings. In the description of the embodiments, the same parts as those in the conventional example are designated by identical references, and their duplex description will be omitted. An object of the present invention is to provide an optical attenuator and an optical attenuator module, in which the wavelength flatness of the optical attenuation factor is excellent and the reliability is so high as to be able to withstand the high intensive optical input.

Figure 1A:
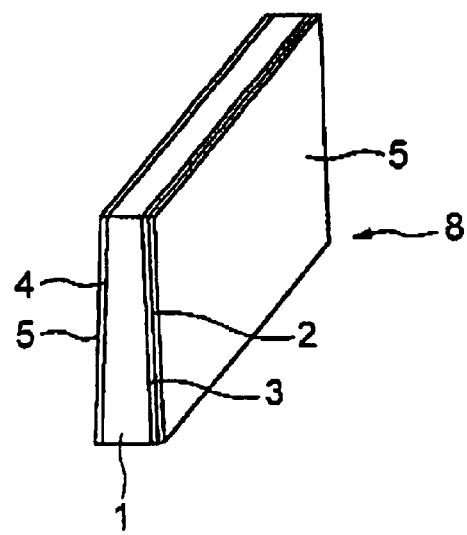
FIGS. 1A to 1C are structural diagrams showing an optical attenuator in accordance with an embodiment of the present invention.
Figure 1B:
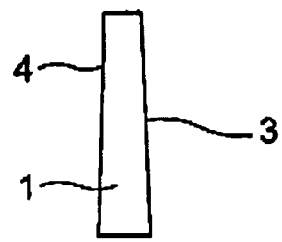
Figure 1C:
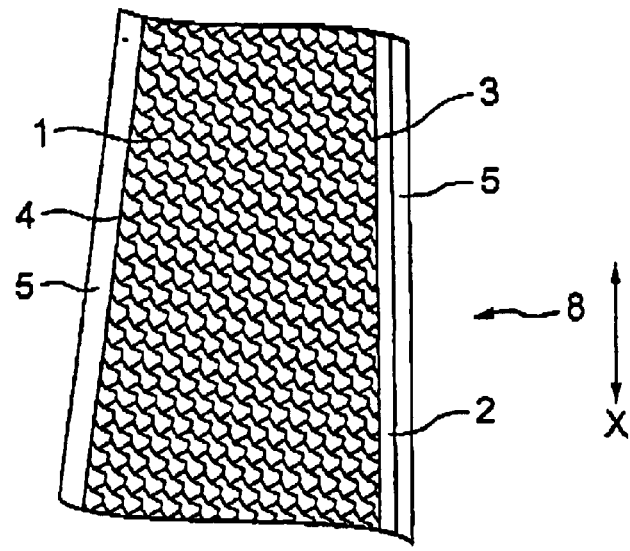

FIGS. 1A to 1C show an optical attenuator in accordance with an embodiment of the present invention, respectively, in which FIG. 1A is a perspective view showing an optical attenuator 8 of this embodiment, and FIG. 1C is a cross-sectional view thereof.

As shown in FIGS. 1A to 1C, the optical attenuator 8 of this embodiment includes a glass substrate 1 that functions as a substrate, an optical attenuation film 2 that attenuates an input light with a predetermined optical attenuation factor, and a protective film 5 for preventing deterioration. The optical attenuation film 2 is formed on at least one face (here, the light input face 3) of the light input face 3 and the light output face 4 of the glass substrate 1. The optical attenuation film 2 may be formed on both faces of the glass substrate 1. The optical attenuator 8 according to this embodiment is disposed, for example, on an optical path of the optical fibers that are optically coupled with each other.

FIG. 1B shows a side view of the above glass substrate 1. As shown in FIGS. 1A, 1B and 1C, the significant feature of the optical attenuator 8 resides in that an angle defined by the light input face 3 and the light output face 4 of the glass substrate 1 is set to a value ranging from 0.15° to 0.5° (for example, 0.3°).

In this embodiment, the glass substrate 1 is shaped in a substantially rectangular parallelepiped, and the light input face 3 and the light output face 4 are not in parallel but tapered. The tapered angle is directed to an angle formed by the light input face 3 and the light output face 4.

As described above, the angle formed by the light input face 3 and the light output face 4 of the glass substrate 1 is set to the value ranging from 0.15° to 0.5°. For that reason, an influence of the periodic structure of the optical attenuation factor spectrum within the glass substrate 1 which is caused by the above-mentioned multiplexing interference on the optical attenuation factor wavelength flatness can be suppressed. Also, an influence of the optical attenuation factor change which is caused by the wavelength dependency of the refractive angle on the glass substrate 1 and the atmospheric interface on the optical attenuation factor wavelength flatness can be suppressed, As a result, the optical attenuation factor wavelength dependency can be made extremely small.

In the optical attenuator disclosed in Japanese Patent No. 2933919, which value the angle defined by the light input face 3 and the light output face 4 of the glass substrate 1 is set to is not studied in detail. This angle suffers from the following problems. That is, in the case where the angle formed by the light input face 3 and the light output face 4 of the glass substrate 1 is large, the wavelength dependency of the optical attenuation factor due to the wavelength dependency of the refractive index on the interface of the glass substrate 1 and the atmosphere appears due to the color dispersion of the glass substrate 1. As a result, the wavelength flatness of the optical attenuation factor may be deteriorated.

Figure 2:
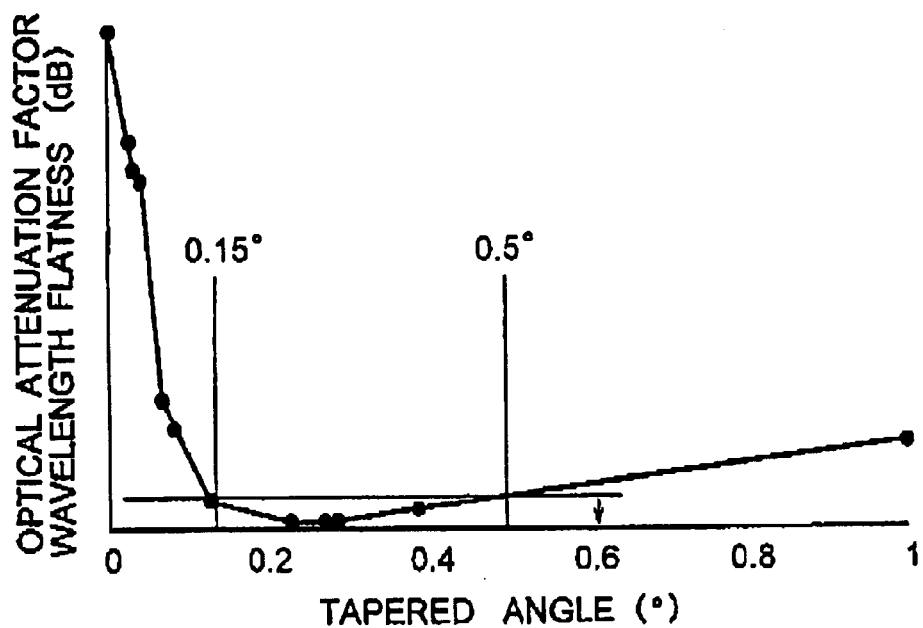
FIG. 2 is a graph showing a relationship between a substrate tapered angle and an optical attenuation factor wavelength flatness of the optical attenuator, FIG. 3 a graph showing the optical attenuation factor wavelength dependency of the optical attenuator in the above embodiment.

On the contrary, in an embodiment of the present invention, as shown in FIG. 2, the optical attenuation factor wavelength flatness at the wavelengths ranging from 1520 nm to 1580 nm is 0.01 dB or less. A difference between the maximum value and the minimum value in the optical attenuation factor spectrum that has passed through the optical attenuator is defined as the wavelength flatness of the optical attenuation factor.

In FIG. 2, the wavelength flatness of the optical attenuation factor is large when the tapered angle is about 0°. It is presumed that this is caused by the periodic structure of the optical attenuation factor spectrum within the glass substrate that is caused by the above-mentioned multiplexing interference.

Then, the influence of the periodic structure of the optical attenuation factor is more reduced as the tapered angle is larger. When the tapered angle is 0.2°, the influenced of the periodic structure disappears, and the optical attenuation factor wavelength flatness becomes substantially 0 dB. When the tapered angle is farther increased, the optical attenuation factor change accompanied by the wavelength dependency of the refractive angle on the glass substrate and the atmospheric interface influences on the optical attenuation factor wavelength flatness. For that reason, it is presumed that the optical attenuation factor wavelength flatness is deteriorated.

The optical attenuation film 2 contains metal as its structural component. The metal whose wavelength dependency of the optical attenuation factor is extremely small in the use wavelength band such as the wavelengths of 1500 nm to 1650 nm is applied. Specifically, Cr (chrome) or Inconel is applied. The optical attenuation film 2 is formed on the glass substrate 1 through vapor evaporation, sputtering or plating.

Figure 5A:
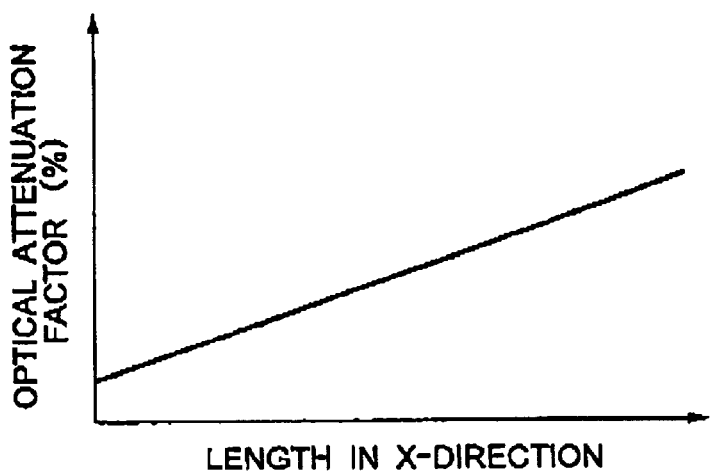
FIGS. 5A and 5B are graphs showing an optical attenuation factor distribution example of the optical attenuator in accordance with an embodiment of the present invention.

The optical attenuation film 2 has the optical attenuation factor distribution in an x-direction along the substrate face of the glass substrate 1, In this embodiment, the optical attenuation factor distribution forms the distribution form in which the optical attenuation factor continuously changes in the x-direction along the substrate face of the glass substrate 1 as shown in FIG. 5A. The abscissa axis (the x-directional length) of the graph shown in the figure represents a length of the glass substrate 1 from its upper end portion in FIG. 1B.

Then, the protective film 5 will be described The protective film 5 is formed on the optical attenuation film formed side surface (the surface of the optical attenuation film 2 on the light input face 3) of the glass substrate 1, and also on the opposite face (the light output face 4).

The protective film 5 is made of dielectric such as $SiO_2$, $TiO_2$, $Ta_2O_5$ or $MgF_2$, or organic material such as polyimide or PMMA (polymethyl methacrylate). The protective film 5 made of the above dielectric or organic material is formed through vapor evaporation, sputtering or spin coating.

The protective film 5 is so disposed as to prevent a chemical change such as oxidation of the surface of the optical attenuation film in the case where a high intensive (an intensity that exceeds a light of 50 mW generally employed conventionally, for example, 200 mW) input light is inputted to the optical attenuation film. The oxidation of the optical attenuation film occurs because the optical attenuation film is in contact with oxygen in the atmosphere, Also, the oxidation is promoted due to a heat occurring when the inputted high output light is attenuated. In the optical attenuator disclosed in Japanese Patent No. 2933219, the optical attenuation film 2 absorbs the input light, to thereby convert the light into the heat within the optical attenuation film 2. If the high intensive light is inputted to the optical attenuation film, the optical attenuation film 2 is heated by the amount of the converted heat. In this case, the optical attenuation film 2 reacts with oxygen in the atmosphere and is oxidized. As a result, there is a case in which the optical attenuation film 2 is locally attenuated in the optical attenuation factor. On the contrary, in one embodiment of the present invention, the protective film is formed on the surface of the optical attenuation film so as to prevent the optical attenuation film from being brought in direct contact with oxygen. With this structure, the oxidation of the optical attenuation is suppressed, thereby being capable of suppressing the optical attenuation factor change such as the optical attenuation factor deterioration of the optical attenuation film.

Various materials that can prevent the deterioration of the optical attenuation film 2 can be applied to the protective film 5. The protective film 5 made of the dielectric or the organic material can provide the physical protective effect with respect to dust, dirt, moisture and so on. Also, the formation of the film is set for antireflection coating in forming the protective film 5 by the above dielectric or organic material (for example, a plurality of layers are multiplexed), thereby being capable of serving as the antireflection coating. For that reason, the protective film 5 may be formed on a surface of the substrate opposite to the surface on which the optical attenuation film is formed.

Also, the protective film 5 may be formed by oxidizing the surface of the optical attenuation film 2 in advance and forming the oxidized film layer as the protective film 5. In addition, the above oxide film layer and the protective film 5 made of the dielectric or organic material may be used together. The thickness of the protective film 5 is set to 10 nm or more.

Figure 3:
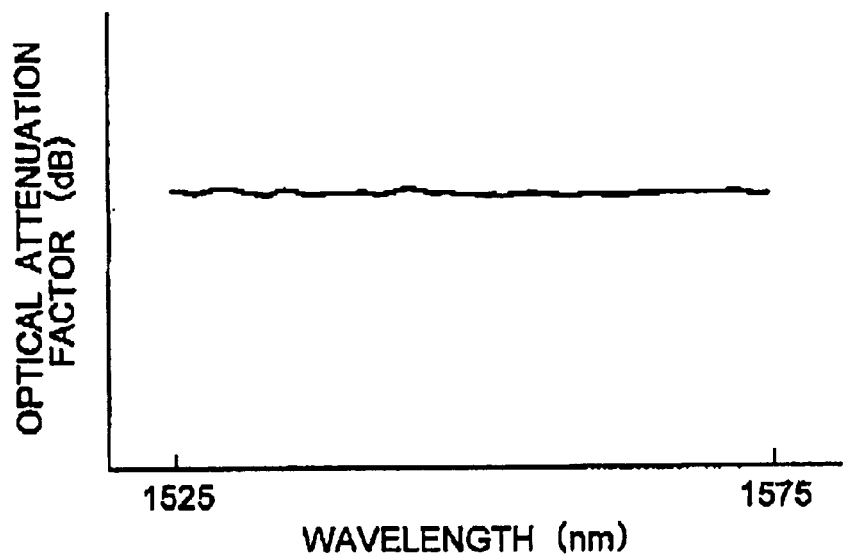

FIG. 3 shows the results of measuring the optical attenuation factor wavelength dependency of the optical attenuator 8 according to this embodiment. As is apparent from the figure, it has been recognized that the optical attenuator 8 of this embodiment is an excellent optical attenuator that hardly has the optical attenuation factor wavelength dependency.

Also, the optical attenuator 8 according to this embodiment is so designed as to form the protective film 5 that prevents the deterioration of the optical attenuation film 2 on the surface of the optical attenuation film 2. For that reason, even if a higher intensive light is inputted, the deterioration of the optical attenuation film 2 can be suppressed by the protective film 5. That is, the optical attenuation film 2 can withstand even the optical input of the high intensity.

Figure 4:
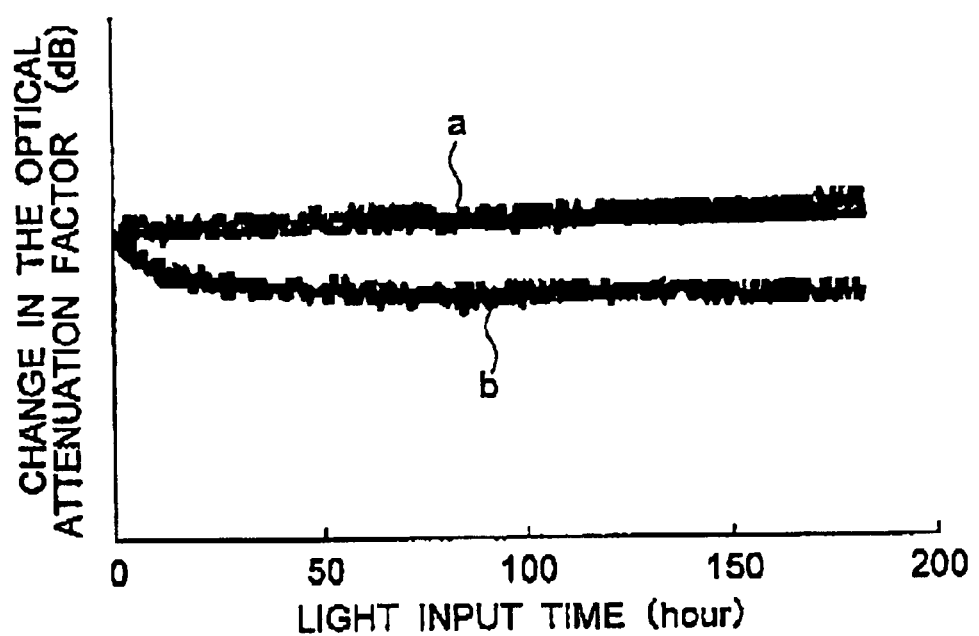
FIG. 4 is a graph comparing an optical attenuation factor fluctuation of the optical attenuation in the above embodiment and that in a conventional optical attenuator.
Figure 10:
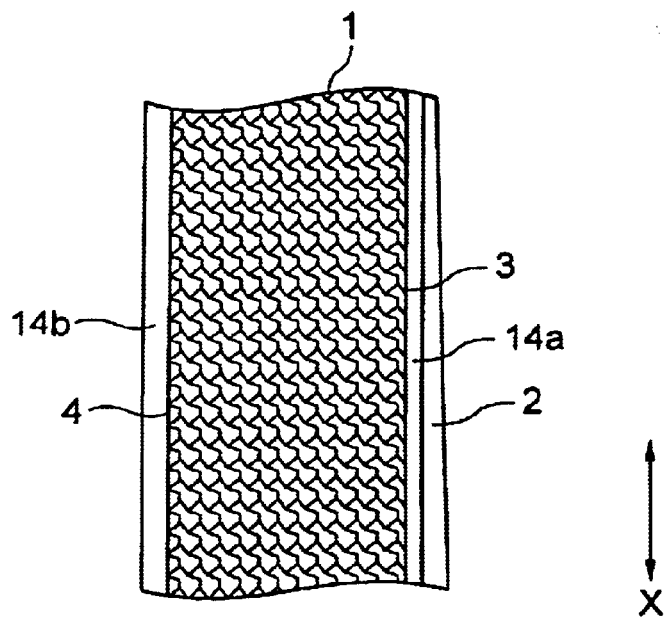
FIG. 10 is a cross-sectional view showing a conventional optical attenuator.

FIG. 4 shows the results of reviewing a change in the optical attenuation factor with respect to a light input time by using the optical attenuator 8 according to this embodiment and the conventional optical attenuator structured as shown in FIG. 10. FIG. 4 shows the results of inputting a light having a wavelength of 1550 nm, an intensity of 200 mW and a beam diameter (diameter) of 0.5 mm. A characteristic line a exhibits the characteristic of the optical attenuator 8, and a characteristic line b exhibits the characteristic of the conventional optical attenuator.

As indicated by the characteristic line b of FIG. 4, the conventional optical attenuator starts to reduce the optical attenuation factor immediately after the light input starts, and rapidly reduces the optical attenuation factor till about 100 hours after the light input starts. In this situation, a change in the optical attenuation factor immediately after the light is inputted is 0.12 dB. The reason why the change in the optical attenuation factor is stabilized about 100 hours after the light input starts is because additional oxidation is suppressed by forming the oxide film on the optical attenuation film 2.

On the contrary, the optical attenuator 8 according to this embodiment hardly changes its optical attenuation factor even after about 180 hours elapses since the light input starts, and the optical attenuation change after the light input time 180 hours elapses is 0.02 dB.

As described above, the optical attenuator 8 according to this embodiment forms the protective film 5 on the surface of the optical attenuation film 2, thereby being capable of preventing the deterioration of the optical attenuation film 2. As a result, even the high intensive light is inputted, the optical attenuation factor hardly changes, Also, it can be recognized that the optical attenuation film 2 can withstand the high intensive optical input.

Therefore, when the optical attenuator module is structured by using the optical attenuator 8 of this embodiment, the wavelength flatness of the optical attenuation factor is excellent, and the optical attenuation film 2 can withstand the high intensive optical input.

Figure 6:
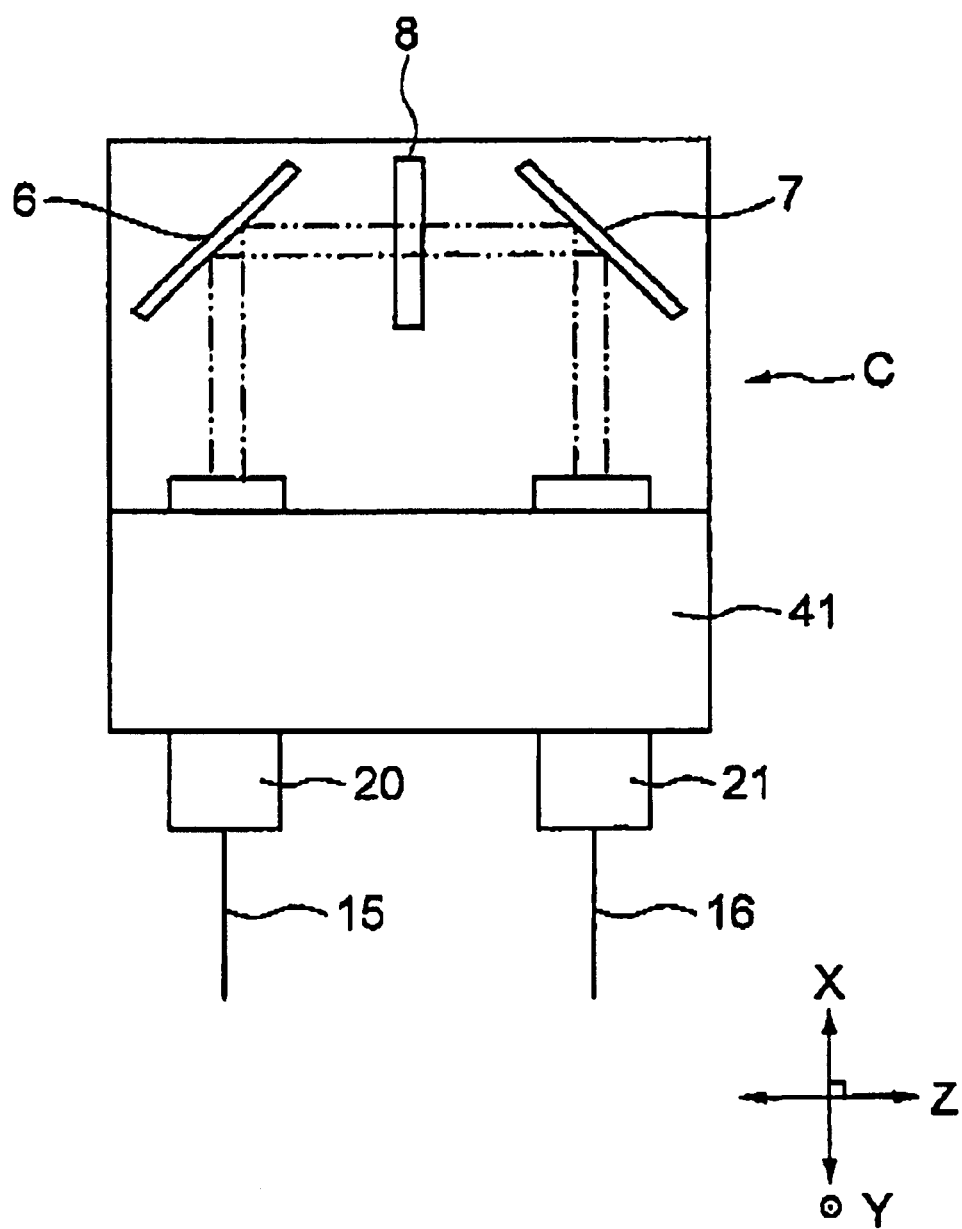
FIG. 6 is a structural diagram showing an optical attenuator module in accordance with a first embodiment of the present invention.

FIG. 6 shows a first embodiment of an optical attenuator module using the optical attenuator of the above-mentioned embodiment. The optical attenuator module has a frame 41 that is shaped in an L viewed from a direction C in the figure. The above-mentioned optical attenuator 8 is fixedly disposed on the frame 41. Fitting holes (not shown) for fixing the collimators 20 and 21 are defined on the side faces of the frame 41, and the collimators 20 and 21 are fixedly inserted into the fitting holes.

The collimators 20 and 21 are formed of optical fibers 15, 16 and lenses (not shown), respectively. The lens disposed in the collimator 20 converts the light having a widened angle outputted from the input side optical fiber 15 into a collimated light beam. On the other hand, the lens disposed in the collimator 21 condenses the light inputted to the lens and inputs the light to the output side optical fiber 16.

In the case where the optical attenuator module is disposed within an optical communication system or an optical measurement system, it is desirable that the input side optical fiber 15 and the output side optical fiber 16 are disposed substantially in parallel with each other. In this embodiment, the collimators 20 and 21 are disposed in parallel with each other. Because the optical fibers 15 and 16 are connected to the collimators 20 and 21, those optical fibers 15 and 16 are disposed in parallel with each other within the optical attenuator module. Mirrors 6 and 7 are disposed within the optical attenuator module as an optical reflecting means that is fixed to the frame 41 with an inclination of 45° with respect to the optical axis of those optical fibers 15 and 16.

In the optical attenuator module according to this embodiment, a light is first inputted from the input side optical fiber 15. The input light is converted into a collimated light beam by the lens of the collimator 20. The collimated light beam is reflected by the mirror 6 and then inputted to the optical attenuator 8. The light beam that has passed through the optical attenuator 8 is reflected by the mirror 7. The light reflected by the mirror 7 is condensed by the lens of the collimator 21 and then outputted from the output side optical fiber 16.

This embodiment is thus structured, and since the optical attenuator according to this embodiment is applied with the optical attenuator 8 of the above-mentioned embodiment, the wavelength flatness of the optical attenuation factor is excellent and the optical attenuator module can withstand the high intensive optical input.

Figure 7:
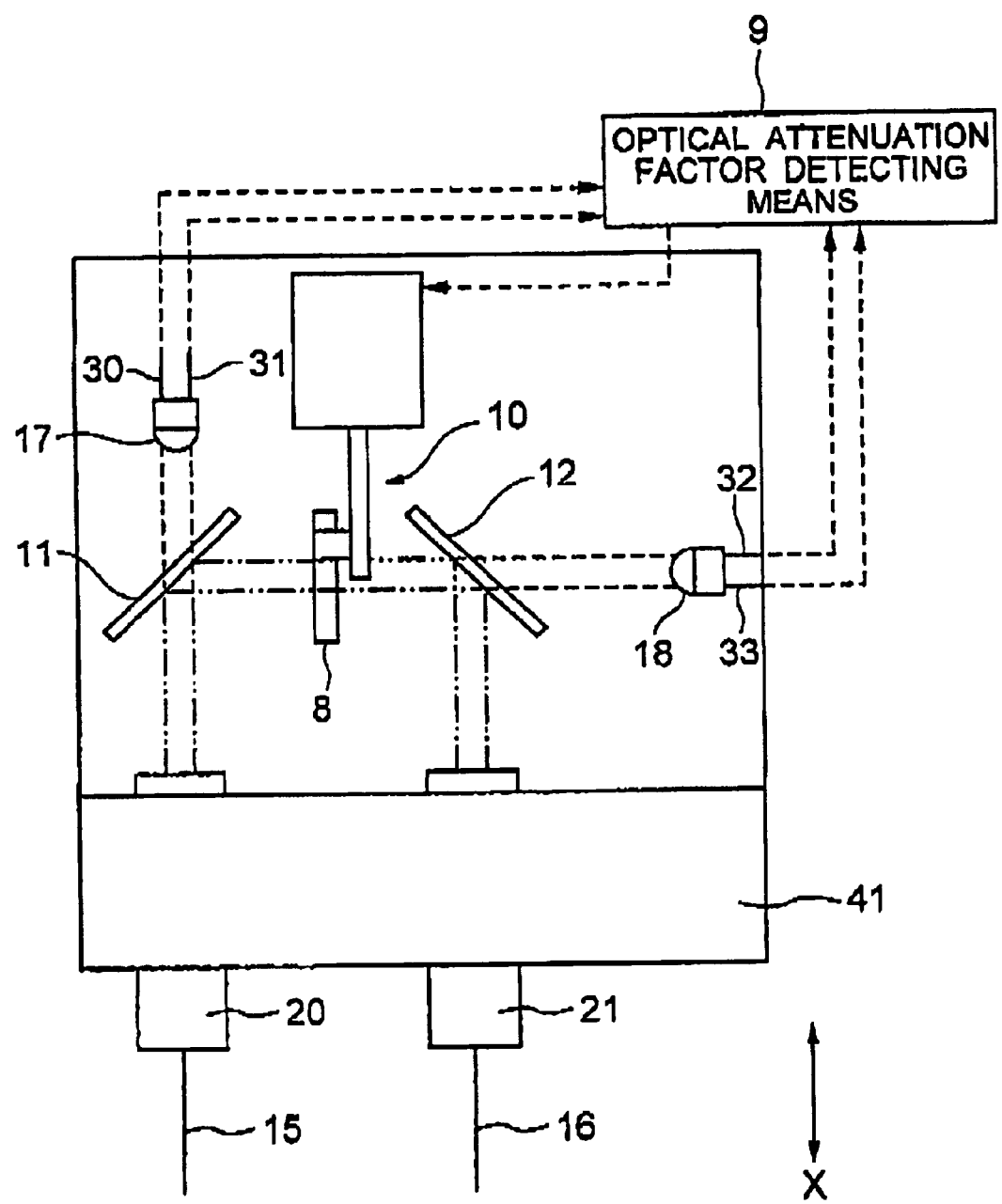
FIG. 7 is a structural diagram showing an optical attenuator module in accordance with a second embodiment of the present invention.

FIG. 7 shows an optical attenuator module in accordance with a second embodiment of the present invention. In the description of this second embodiment the same pats as those in the above-mentioned first embodiment are designated by like references, and their description will be omitted or simplified.

As shown in the figure, similarly to the optical attenuator module according to the above-mentioned first embodiment, the optical attenuator module according to the second embodiment includes a frame 41, an optical attenuator 8 according to the above embodiment disposed on the frame 41, and collimators 20 and 21.

Also, in the optical attenuator module according to the second embodiment, the mirrors 6 and 7 disposed in the optical attenuator module according to the above-mentioned first embodiment are replaced by beam splitters 11 and 12. In addition, the optical attenuator module according to the second embodiment includes photo diodes 17, 18 and optical attenuator moving means 10.

The beam splitter 11 functions as a first optical branching means that branches a light and inputs one of the branched light to the optical attenuator 8. The beam splitter 12 functions as a second optical branching means that branches a light that has passed through the optical attenuator 8. In this embodiment, both of the beam splitters 11 and 12 allow 5% of the inputted light to pass therethrough and reflect the remaining 95% of the light.

The photodiode 17 functions as a first photo detector means that receives 5% of the light that has passed through the beam splitter 11 (a light except for the light inputted to the optical attenuator 8 among the branched lights) to detect the intensity of the received light. The photodiode 18 functions as a second photo detector means that receives 5% of the light that has passed through the beam splitter 12 (a light except for the light inputted to the collimator 21 among the branched lights) to detect the intensity of the received light. In the figure, reference numeral 30, 31, 32 and 33 represent electrode pins, respectively.

The optical attenuator moving means 10 moves the optical attenuator 8 in a direction (in this example, x-direction) crossing the optical attenuation factor distribution region of the optical attenuation film.

The optical attenuator module according to the second embodiment is structured as described above, and as shown in the figure, the optical attenuator module is connected with an optical attenuation factor detecting means 9 as an external system, for example.

The optical attenuation factor detecting means 9 is so designed as to control the movement of the optical attenuator moving means 10 on the basis of the light intensity detected by the photodiode 17 and the photodiode 18, to thereby obtain the optical attenuation factor of the optical attenuator 8.

That is, the optical attenuator moving means 10 is so designed as to move the optical attenuator 8 in the x-direction crossing the optical attenuation factor distribution region of the optical attenuation film on the basis of the optical attenuation factor detected by the optical attenuation factor detecting means 9.

The second embodiment also has the same effect as those of the above-mentioned first embodiment by the same operation. Also, in the second embodiment, as described above, since the respective intensities are detected by the photodiodes 17 and 18, the optical attenuation factor of the optical attenuator 8 can be obtained by the optical attenuation factor detecting means 9 on the basis of the detected light intensity.

Therefore, in the second embodiment, the optical attenuation factor of the optical attenuator 8 can be set to a desired value. For example, the optical attenuation factor by the optical attenuator 8 can be made to always coincide with a predetermined value.

Figure 8:
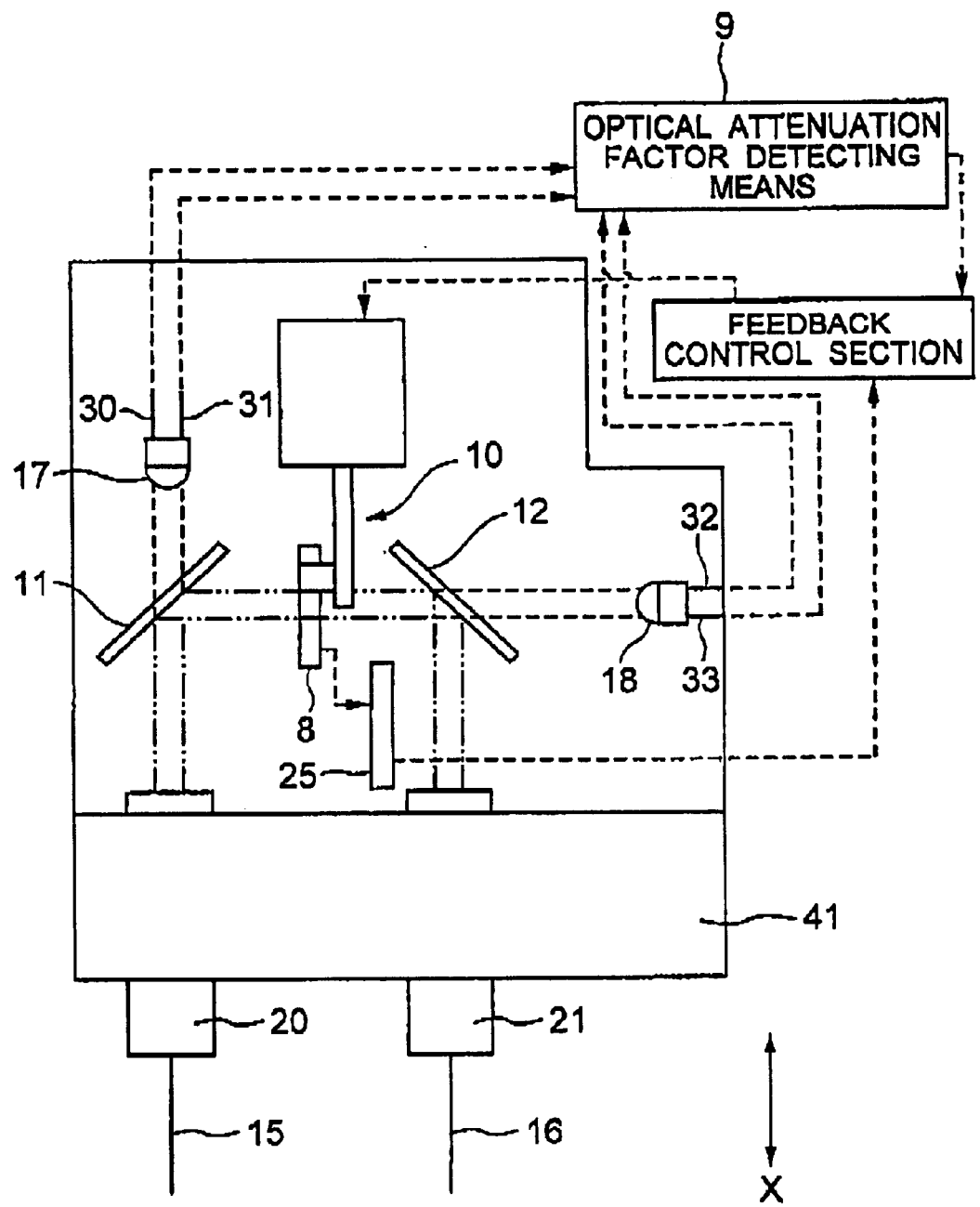
FIG. 8 is a structural diagram showing an optical attenuator module in accordance with a third embodiment of the present invention.

FIG. 8 shows an optical attenuator module in accordance with a third embodiment of the present invention. In the description of the third embodiment, the same parts as those in the second embodiment are designated by identical references, and their description will be omitted or simplified.

A structure of the third embodiment different from the second embodiment resides in that there is provided a potentiometer 25 for detecting a position at which the optical attenuator 8 is arranged. The potentiometer 25 is a measuring device that converts a physical position into a voltage and measures the voltage. An electrode is disposed on a back face of the optical attenuation film 2 of the optical attenuator 8, and a leading end of the electrode is in contact with the potentiometer 25. Then, when, for example, 5 V is applied to the potentiometer in advance, the potentiometer outputs a value ranging from 0 V to 5 V in accordance with a location at which the electrode is in contact with the potentiometer 25.

Figure 5B:
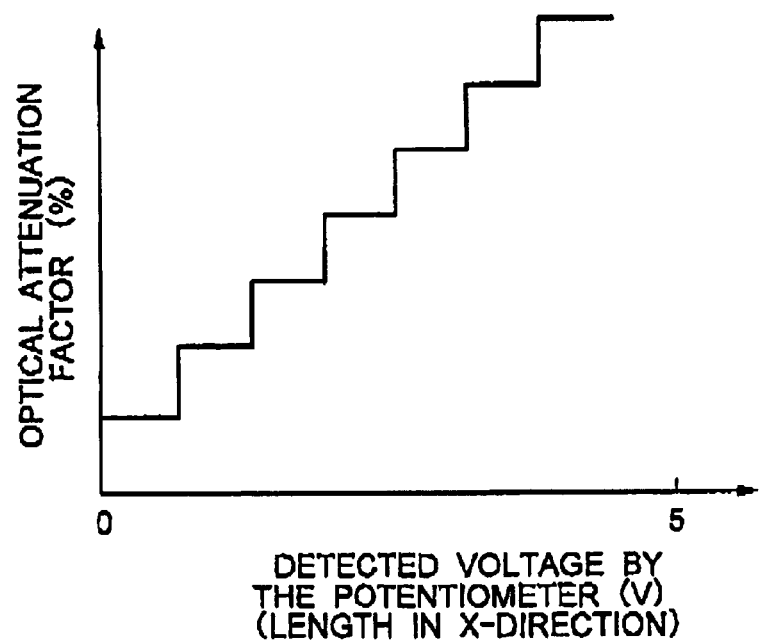

In the third embodiment, the optical attenuation factor distribution of the optical attenuation film 2 of the optical attenuator 8 has a stepped distribution as shown in FIG. 5B. The relationship data of the output of the potentiometer 25 and the attenuation factor distribution of the optical attenuation film 2 is predetermined with the position at which the optical attenuator 8 is arranged as the output of the potentiometer 25.

The third embodiment is thus structured, and the optical attenuator module according to the third embodiment is connected with a feedback control section 23 and an optical attenuation amount detecting means 9 as external systems, for example, as shown in FIG. 8.

The feedback control section 23 moves the optical attenuator 8 by the optical attenuator moving means 10 so that the optical attenuation factor of the optical attenuator module becomes a predetermined optical attenuation factor on the basis of the detected data (detected voltage) by the potentiometer 25 and the above relationship data shown in FIG. 5B.

The optical attenuation amount detecting means 9 obtains the optical attenuation factor of the optical attenuator 8 on the basis of the light intensities detected by the photodiodes 17 and 18, respectively, as in the above-mentioned second embodiment.

Similarly, the third embodiment has the same effects as those in the above-mentioned second embodiment through the same operation. Also, in the third embodiment, a position at which the optical attenuator 8 is disposed is detected by the potentiometer 25, and the optical attenuator 8 is moved so that the optical attenuation factor of the optical attenuation module becomes a predetermined optical attenuation factor on the basis of the above detected results (for example, under the control by the feedback control section 23). For that reason, the optical attenuation factor by the optical attenuator 8 can be made to always coincide with the predetermined optical attenuation factor.

Also, in the third embodiment, the optical attenuation factor of the optical attenuator 8 can be obtained by the optical attenuation factor detecting means 9 on the basis of the detected light intensity by the photodiodes 17 and 18. For that reason, the movement of the optical attenuator 8 by the optical attenuator moving means 10 can be more accurately conducted.

The present invention is not limited to the above embodiment, but can be applied with various embodiments. For example, in the above respective embodiments, the optical attenuation film 2 of the optical attenuator 8 has an optical attenuation factor distribution as shown in FIGS. 5A and 5B. However, the optical attenuation factor distribution of the optical attenuation film 2 of the optical attenuator 8 is not particularly limited but appropriately set. For example, the optical attenuation film 2 of the optical attenuator 8 may have an optical attenuation factor distribution in a direction other than the x-direction shown in the figure, or there may be disposed the optical attenuation film 2 of the uniform optical attenuation factor without any optical attenuation factor distribution.

In addition, in the above-mentioned respective embodiments, the optical attenuator 8 forms the optical attenuation film 2 on the light input face 3 of the glass substrate 1, however, the optical attenuation film 2 may be formed on the light output face 4 of the glass substrate 1. Also, the optical attenuation film 2 may be formed on both of the light input face 3 and the light output face 4.

In addition, in the above-mentioned respective embodiments, the optical attenuator 8 forms the protective film 5 even on an opposite face (the light output face 4 in the above embodiment) side to the optical attenuation film formation face of the glass substrate 1, but the protective film 5 may be omitted.

In addition, in the above-mentioned respective embodiments, the glass substrate 1 is so structured as to have the rectangular light input face 3 and light output face 4. However, the shapes of the glass substrate 1 and the optical attenuation film 2 are not particularly restricted. For example, the light input face 3 and the light output face 4 of the glass substrate 1 can be circle-shaped or fan-shaped.

Also, in the case where the light input face 3 and the light output face 4 of the glass substrate 1 are thus circle-shaped or fan-shaped, the optical attenuation factor distribution of the optical attenuation film 2 may be formed in a circumferential direction or a radial direction of the glass substrate 1.

In addition, the optical attenuator module in the above third embodiment is provided with the potentiometer 25 as a means for detecting the position at which the optical attenuator 8 is disposed, but the present invention is not limited to this structure but appropriately set.

Also, for example, in the optical attenuator module of the above third embodiment, the optical attenuation factor distribution of the optical attenuation film 2 of the optical attenuator 8 may be identical with the distribution of the optical attenuation film 2 in the optical attenuator 8 which is applied to the above first and second embodiments.

Also, in the case where the beam splitters 11 and 12 are disposed to structure the optical attenuator module as in the optical attenuator modules of the above-mentioned second and third embodiments, its optical transmission factor may be set to a value different from the value in the above-mentioned second and third embodiments. Also, an optical branching means other than the beam splitters 11 and 12 may be disposed.

In addition, in the optical attenuator module of the above-mentioned second and third embodiments, any one of the beam splitters 11 and 12 may be an optical reflecting means such as a mirror. Any one of the beam splitters 11 and 12 may be an optical reflecting means such as a mirror and the other beam splitter may be an optical branching means other than a beam splitter.

In addition, the optical attenuator module of the above-mentioned second embodiment is connected with the optical attenuation amount detecting means 9 as its external system, and the optical attenuator module of the above-mentioned third embodiment is further connected with the feedback control section 23. However, the external system connected to the optical attenuator module of the present invention is not particularly restricted but appropriately set.

Also the above-mentioned external system can be included not as the external system, but the structural component of the optical attenuator module.

In addition, the optical attenuator can be moved by the optical attenuator moving means so that the optical attenuation factor of the optical attenuator module becomes the predetermined attenuation factor on the basis of the position detection data of the optical attenuator by the potentiometer and the relationship data of the predetermined optical attenuator arrangement and the attenuation factor distribution of the optical attenuation film, as in the above-mentioned third embodiment.

Therefore, in the above-mentioned third embodiment, the optical attenuation amount detecting means 9 may not be connected. That is, the optical branching means such as the beam splitters 11 or 12 and the photo detector means such as the photodiodes 17 and 18 may be omitted. Also, the first and second optical branching means may be replaced with the optical reflecting means such as a mirror.

In addition, in the optical attenuator module of the present invention, if the optical path of the light inputted from its one end side is so structured as to output the light from the other end side without being refracted, the optical reflecting means or the optical branching means can be omitted. If the optical attenuator module is structured as in the above-mentioned respective embodiments, the downsizing of the device and the work of connecting to another device can be improved.

Figure 9A:
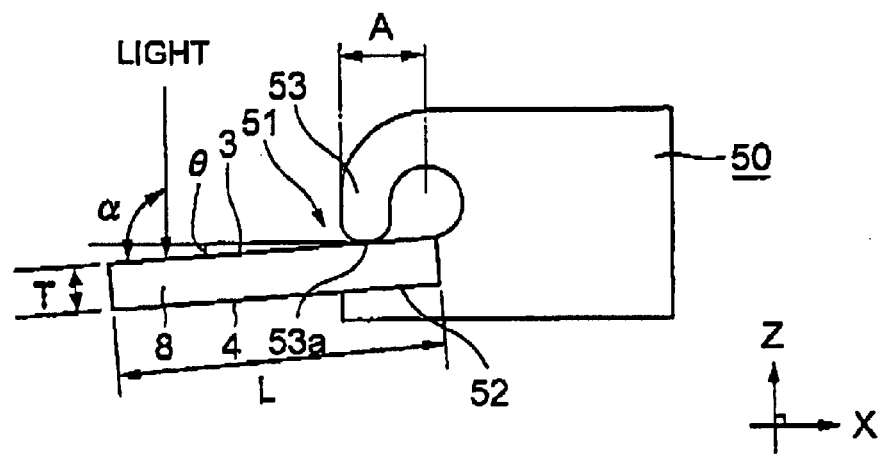
FIGS. 9A and 9B are a structural cross-sectional view and a structural perspective view showing an optical attenuator fixing means in accordance with an embodiment of the present invention, respectively.
Figure 9B:
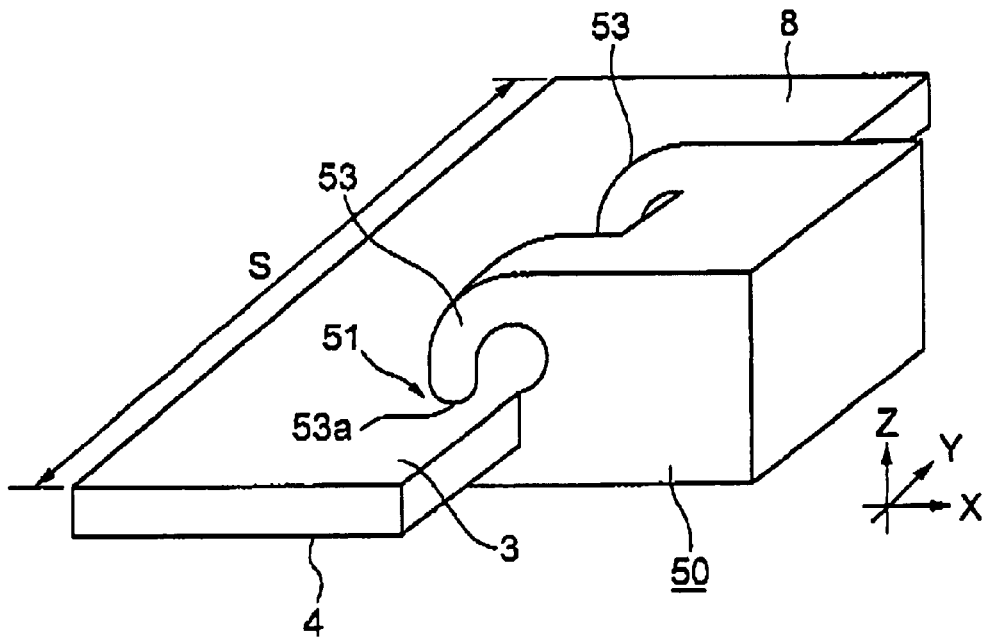

Then, a structure of retaining the optical attenuator will be described with reference to FIGS. 9A and 9B. FIG. 9A shows a side view along a line X–Z, and FIG. 9B shows a perspective view thereof.

An optical attenuator fixing means 50 includes a nipping portion 51, and an end portion of the optical attenuator 8 is nipped by the nipping portion 51. The nipping portion 51 is so structured as to fixedly nip the optical attenuator 8 from a direction along which the light input face 3 and the light output face 4 are nipped.

The nipping portion 51 includes an optical attenuation film support face 52 having a tapered angle α defined by the light input face 3 and the light output face 4 of the optical attenuator 8, and an urging means 53 that urges the end portion of the optical attenuator 8 toward the optical attenuation film support face 52 side to fix the optical attenuator S. The optical attenuator fixing means 50 is made of, for example, nylon or resin such as polyaccetal.

The urging means 53 is formed of two curved arms formed in the y-direction at an interval. The urging means 53 has an elasticity due to the arm shaped structure. Then, the urging means 53 nips the end portion of the optical attenuator due to the elastic force. The leading end 53a of the urging means 53 is shaped in semi-sphere. With this structure, the leading end 53a side of the urging means 53 is in contact with the optical attenuator 8 in a substantially point contact manner.

The optical attenuation film support face 52 of the optical attenuator fixing means 50 is about 1.1 mm in the x-directional length and about 5 mm in the y-directional length, and an interval of the optical attenuation film support face 52 and the leading end 53a of the urging means 53 is about 0.53 mm.

Figure 11:
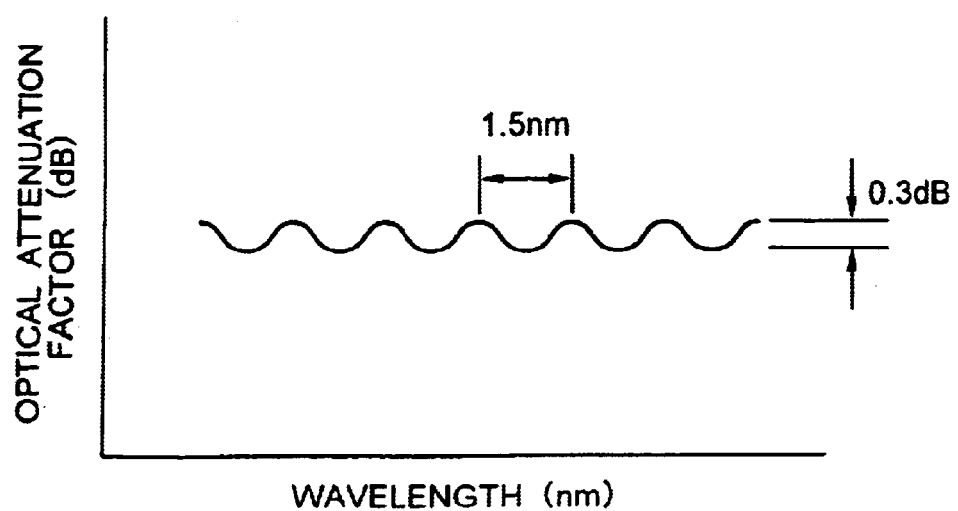
FIG. 11 is a graph showing the optical attenuation factor wavelength dependency of a conventional optical attenuator.

Also, in this embodiment, the urging means 53 is disposed at a position where the light inputted to the optical attenuator 8 is not influenced by the refractive index anisotropy due to the optical filter urging stress of the urging means 53. That is, it is assumed that the length of A shown in FIG. 11 is about 1 mm. The urging position of the optical attenuator 8 due to the urging means 53 is located about 1 mm from one end (the right end in FIG. 1A) of the optical attenuator 8. The light is inputted to a position inside of the other end (the left end in FIG. 1A) of the optical attenuator by about 0.7 mm, to thereby make a structure in which the optical attenuator 8 is not influenced by the refractive index anisotropy as described above.

This embodiment is structured as described above, and the optical attenuator 8 is supported by the optical attenuation film support face 52 that constitutes the nipping portion 51 of the optical attenuator fixing means 50. Also, the end portion of the optical attenuator 8 is urged toward the optical attenuation film support face 52 by the elastic force of the urging means 53 to fixedly nip the end portion of the optical attenuator 8.

In this embodiment, since the optical attenuation film support face 52 of the optical attenuator fixing means 50 has the tapered angle defined by the light input face 3 and the light output face 4 of the optical attenuator 8, the optical attenuator 8 can be accurately fixed.

Also, according to this embodiment, the urging means 53 is so structured as to urge the end portion of the optical attenuator 8 toward the optical attenuation film support face 52 due to the elastic force. With this structure, the optical attenuator 8 is not influenced by the expansion/contraction of the adhesive due to a heat, which is different from a case in which the optical attenuator is fixed by the adhesive. That is, the optical attenuator 8 can be fixed despite a temperature change.

In addition, according to this embodiment, the urging means 53 is located at a position where the light inputted to the optical attenuator 8 is not influenced by the refractive index anisotropy due to the force by which the optical attenuator of the urging means 53 is urged. With this structure, the light inputted to the optical attenuator 8 is not influenced by the refractive index anisotropy.

Therefore, the optical attenuator module having the optical attenuator fixing means 50 of this embodiment can reduce the influence of a temperature change.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An optical attenuator device comprising:
   a substrate having a light receiving surface and an output surface, wherein an angle of at least 0.15° but less than 0.50° is defined by the light receiving surface and the output surface of said substrate; and
   an optical film configured to attenuate light in accordance with a predetermined attenuation factor, the optical film being formed on at least a portion of said light receiving surface and said output surface of said substrate.

2. An optical attenuator device according to claim 1, which further comprises a protective film for preventing deterioration of said optical film which is formed on a surface of said optical film.

3. An optical attenuator device according to claim 2, wherein a thickness of said protective film is set to be at least 10 nm.

4. An optical attenuator device according to claim 1, wherein said optical film has an optical attenuation factor distribution in at least one direction along a substrate surface.

5. An optical attenuator device according to claim 2, wherein said optical film has an optical attenuation factor distribution in at least one direction along a substrate surface.

6. An optical attenuator device according to claim 3, wherein said optical film has an optical attenuation factor distribution in at least one direction along a substrate surface.

7. An optical attenuator device according to claim 4, wherein the optical attenuation factor distribution has a distribution form in which the optical attenuation factor continuously changes in at least one direction along the substrate surface.

8. An optical attenuator device according to claim 5, wherein the optical attenuation factor distribution has a distribution form in which the optical attenuation factor continuously changes in at least one direction along the substrate surface.

9. An optical attenuator device according to claim 6, wherein the optical attenuation factor distribution has a distribution form in which the optical attenuation factor continuously changes in at least one direction along the substrate surface.

10. An optical attenuator module, comprising:
    an optical attenuator device comprising:
        a substrate having a light receiving surface and an output surface,
        wherein an angle of at least 0.15° but less than 0.50° is defined by the light receiving surface and the output surface of said substrate;
        an optical film configured to attenuate light in accordance with a predetermined attenuation factor, the optical film being formed on at least a portion of said light receiving surface and said output surface of said substrate;
        a first optical fiber that provides light to said substrate from an outside;
        a second optical that receives the provided light from said substrate, and outputs the light to the outside; and
    means for moving said optical attenuator device.

11. An optical attenuator module according to claim 10, wherein said means for moving moves in a direction crossing an optical attenuation factor distribution region of said optical film.

12. An optical attenuator module, comprising:
    an optical attenuator device comprising:
        a substrate having a light receiving surface and an output surface,
        wherein an angle of at least 0.15° but less than 0.5° is defined by the light receiving surface and the output surface of said substrate;
        an optical film configured to attenuate light in accordance with a predetermined attenuation factor, the optical film being formed on at least a portion of said light receiving surface and said output surface of said substrate;

a first optical branching means for branching that receives a provided light from a first optical fiber to provide one of branched lights to said optical attenuator device;

a second optical branching means for branching that receives a provided light from said optical attenuator device;

a first photo detector means for receiving the branched lights branched by said first optical branching means except for the light provided to said optical attenuator device to detect intensity of the received light; and a second photo detector means for receiving one of the branched lights branched by said second optical branching means to detect intensity of the received light.

13. An optical attenuator module, comprising:

an optical attenuator device comprising:

a substrate having a light receiving surface and an output surface, wherein an angle of at least 0.15° but less than 0.5° is defined by the light receiving surface and the output surface of said substrate;

an optical film configured to attenuate light in accordance with a predetermined attenuation factor, the optical film being formed on at least a portion of said light receiving surface and said output surface of said substrate;

an optical branching means for branching that receives a provided light from a first optical fiber to provide one of branched lights to said optical attenuator device;

an optical reflecting means for reflecting that receives a provided light from said optical attenuator device; and a photo detector means for receiving the branched lights branched by said optical branching means except for the light provided to said optical attenuator device to detect intensity of the received light.

14. An optical attenuator module, comprising:

an optical attenuator device comprising:

a substrate having a light receiving surface and an output surface, wherein an angle of at least 0.15° but less than 0.5° is defined by the light receiving surface and the output surface of said substrate;

an optical film configured to attenuate light in accordance with a predetermined attenuation factor, the optical film being formed on at least a portion of said light receiving surface and said output surface of said substrate;

an optical reflecting means for reflecting that receives a provided light from a first optical fiber to provide the reflected light to said optical attenuator device;

an optical branching means for branching that receives the provided light from said optical attenuator device; and a photo detector means for receiving one of branched lights branched by said optical branching means to detect intensity of the received light.

15. An optical attenuator module according to claim 10, wherein said optical attenuator device has an optical attenuator position detecting means for detecting an arrangement position, relationship data between the arrangement position of said optical attenuator device and the attenuation factor distribution of the optical film is predetermined, and said optical attenuator position detecting means detects the arrangement position of said optical attenuator device to control the optical attenuation factor.

16. An optical attenuator module according to claim 12, wherein said optical attenuator device has an optical attenuator position detecting means for detecting an arrangement position, relationship data between the arrangement position of said optical attenuator device and the attenuation factor distribution of the optical film is predetermined, and said optical attenuator position detecting means detects the arrangement position of said optical attenuator device to control the optical attenuation factor.

17. An optical attenuator module according to claim 13, wherein said optical attenuator device has an optical attenuator position detecting means for detecting an arrangement position, relationship data between the arrangement position of said optical attenuator device and the attenuation factor distribution of the optical film is predetermined, and said optical attenuator position detecting means detects the arrangement position of said optical attenuator device to control the optical attenuation factor.

18. An optical attenuator module according to claim 14, wherein said optical attenuator device has an optical attenuator position detecting means for detecting an arrangement position, relationship data between the arrangement position of said optical attenuator device and the attenuation factor distribution of the optical film is predetermined, and said optical attenuator position detecting means detects the arrangement position of said optical attenuator device to control the optical attenuation factor.

19. An optical attenuator module according to claim 12, further comprising an optical attenuation factor detecting means for obtaining an optical attenuation factor on the basis of a light intensities detected by said first photo detector means and said second photo detector means.

20. An optical attenuator module according to claim 13, further comprising an optical attenuation factor detecting means for obtaining an optical attenuation factor on the basis of a light intensities detected by said first photo detector means and said second photo detector means.

21. An optical attenuator module according to claim 14, further comprising an optical attenuation factor detecting means for obtaining an optical attenuation factor on the basis of a light intensities detected by said first photo detector means and said second photo detector means.

22. An optical attenuator module according to claim 10, wherein said optical attenuator device includes an optical attenuator fixing means, said optical attenuator fixing means has a nipping portion and fixedly nips an end portion of said optical attenuator device from a direction that crosses said optical film by said nipping portion, and said nipping portion includes an optical film support face that has a predetermined angle with respect to an optical axis of a light that is provided to said optical film, and an urging means for fixedly urging an end portion of said optical film to said optical film support face.

23. An optical attenuator module according to claim 12, wherein said optical attenuator device includes an optical attenuator fixing means, said optical attenuator fixing means has a nipping portion and fixedly nips an end portion of said optical attenuator device from a direction that crosses said optical film by said nipping portion, and said nipping portion includes an optical film support face that has a predetermined angle with respect to an optical axis of a light that is provided to said optical film, and an urging means for fixedly urging an end portion of said optical film to said optical film support face.

24. An optical attenuator module according to claim 13, wherein said optical attenuator device includes an optical attenuator fixing means, said optical attenuator fixing means has a nipping portion and fixedly nips an end portion of said optical attenuator device from a direction that crosses said optical film by said nipping portion, and said nipping portion includes an optical film support face that has a predetermined angle with respect to an optical axis of a light that is provided to said optical film, and an urging means for fixedly urging an end portion of said optical film to said optical film support face.

25. An optical attenuator module according to claim 14, wherein said optical attenuator device includes an optical attenuator fixing means, said optical attenuator fixing means has a nipping portion and fixedly nips an end portion of said optical attenuator device from a direction that crosses said optical film by said nipping portion, and said nipping portion includes an optical film support face that has a predetermined angle with respect to an optical axis of a light that is provided to said optical film, and an urging means for fixedly urging an end portion of said optical film to said optical film support face.

26. An optical attenuator module according to claim 22, wherein said urging means urges the end portion of the optical film against said optical film support face due to the elastic force.

27. An optical attenuator module according to claim 23, wherein said urging means urges the end portion of the optical film against said optical film support face due to the elastic force.

28. An optical attenuator module according to claim 24, wherein said urging means urges the end portion of the optical film against said optical film support face due to the elastic force.

29. An optical attenuator module according to claim 25, wherein said urging means urges the end portion of the optical film against said optical film support face due to the elastic force.

30. An optical attenuator module according to claim 22, wherein said urging means is disposed at a position where a refractive index anisotropy of said optical film is not influenced by an urging force of said urging means.

31. An optical attenuator module according to claim 23, wherein said urging means is disposed at a position where a refractive index anisotropy of said optical film is not influenced by an urging force of said urging means.

32. An optical attenuator module according to claim 24, wherein said urging means is disposed at a position where a refractive index anisotropy of said optical film is not influenced by an urging force of said urging means.

33. An optical attenuator module according to claim 25, wherein said urging means is disposed at a position where a refractive index anisotropy of said optical film is not influenced by an urging force of said urging means.

34. An optical attenuator module according to claim 22, wherein a lens that is optically coupled to said optical attenuator device is disposed at a side at least before the light is provided to said optical attenuator device or after the light is outputted from said optical attenuator device.

35. An optical attenuator module according to claim 23, wherein a lens that is optically coupled to said optical attenuator device is disposed at a side at least before the light is provided to said optical attenuator device or after the light is outputted from said optical attenuator device.

36. An optical attenuator module according to claim 24, wherein a lens that is optically coupled to said optical attenuator device is disposed at a side at least before the light is provided to said optical attenuator device or after the light is outputted from said optical attenuator device.

37. An optical attenuator module according to claim 25, wherein a lens that is optically coupled to said optical attenuator device is disposed at a side at least before the light is provided to said optical attenuator device or after the light is outputted from said optical attenuator device.

38. An optical attenuator device comprising:
a substrate having a light receiving surface and an output surface, wherein an angle of between about 0.2° and about 0.4° is defined by the light receiving surface and the output surface of said substrate; and
an optical film configured to attenuate light in accordance with a predetermined attenuation factor, the optical film being formed on at least a portion of said light receiving surface and said output surface of said substrate.

39. The optical attenuator device of claim 38, wherein said angle is about 0.3°.

40. An optical attenuator comprising a substrate having a light receiving surface and an output surface, and an optical film configured to attenuate light in accordance with a predetermined attenuation factor, the optical film being formed on at least a portion of said light receiving surface and said output surface of said substrate, an optical attenuation factor wavelength flatness at wavelengths ranging from 1520 nm to 1580 nm being 0.01 dB or less, when a difference between a maximum value and a minimum value in an optical attenuation factor spectrum that passes through said optical attenuator is defined as said optical attenuation factor wavelength flatness.

* * * * *